Oct. 27, 1959  R. D. PORTER  2,909,896
EMERGENCY FUEL CONTROL
Filed Sept. 21, 1956  3 Sheets-Sheet 2

INVENTOR
ROBERT D. PORTER
BY Leonard F. Wieklund
ATTORNEY

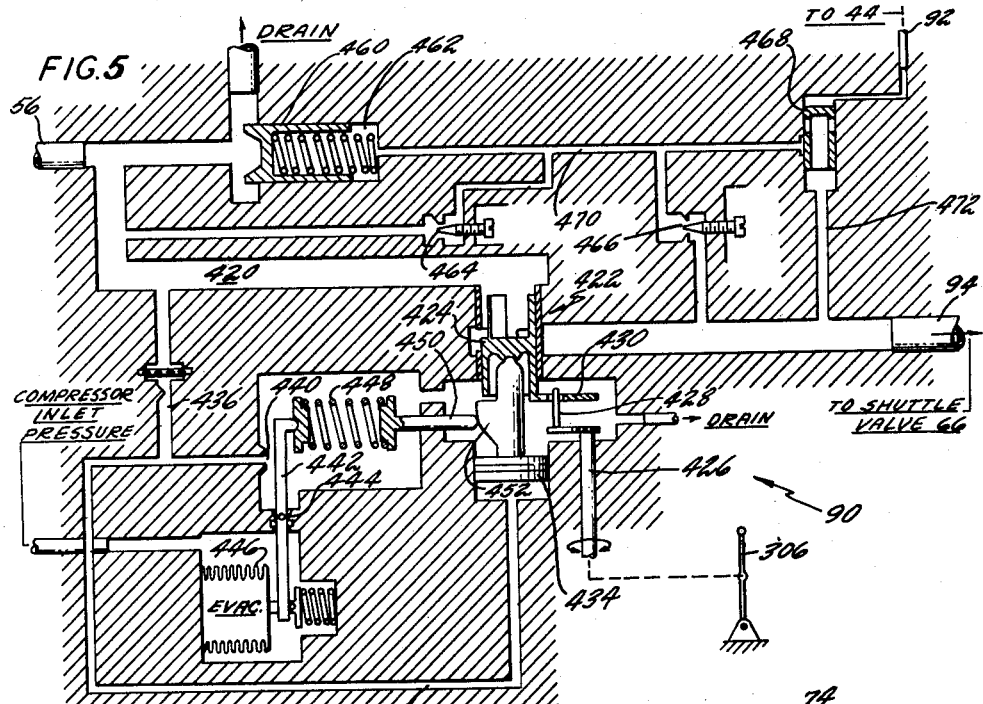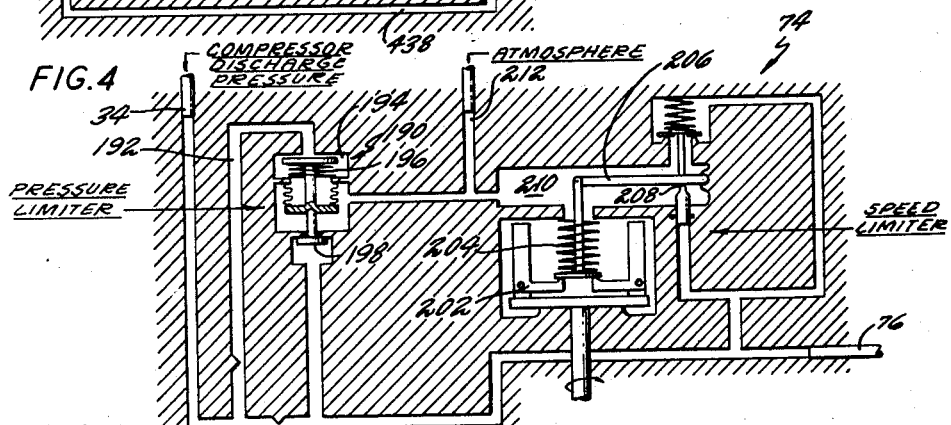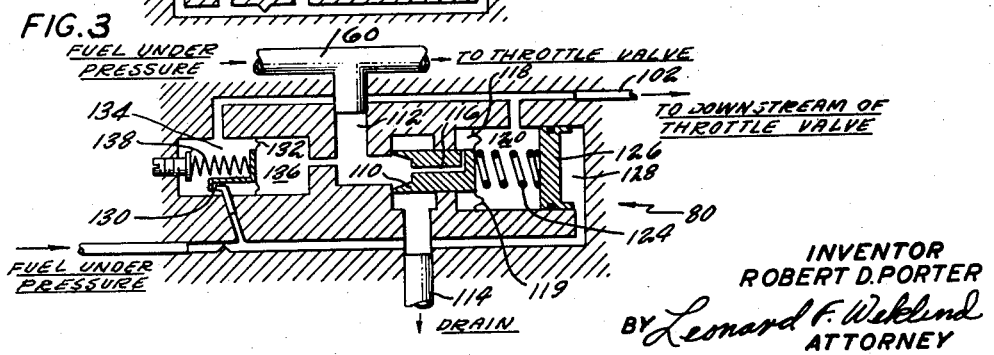

United States Patent Office 2,909,896
Patented Oct. 27, 1959

2,909,896

EMERGENCY FUEL CONTROL

Robert D. Porter, Windsor, Conn., assignor to United Aircraft Corporation, East Hartford, Conn., a corporation of Delaware Application September 21, 1956, Serial No. 611,174

2 Claims. (Cl. 60—39.28)

This invention relates to fuel controls for turbine type power plants and more specifically to emergency fuel control systems therefor.

It is an object of this invention to provide a fuel control which includes a means for regulating the pressure drop across the main throttle valve.

It is a further object of this invention to provide a fuel control of the type described including means responsive to a predetermined signal for decreasing fuel flow by a given or predetermined percentage.

It is a still further object of this invention to provide a fuel control of the type described including a plurality of adjustably fixed orifices in parallel with the main throttle valve for determining the pressure drop across the throttle valve including means for bypassing one of said orifices.

These and other objects of this invention will become readily apparent from the following detailed description of the drawing in which:

Fig. 3 is an enlarged cross sectional illustration of the pressure regulator;

Fig. 4 is an enlarged schematic of the topping and speed limiting unit; and

Fig. 5 is a schematic enlargement of the emergency control unit.

Figure 1:
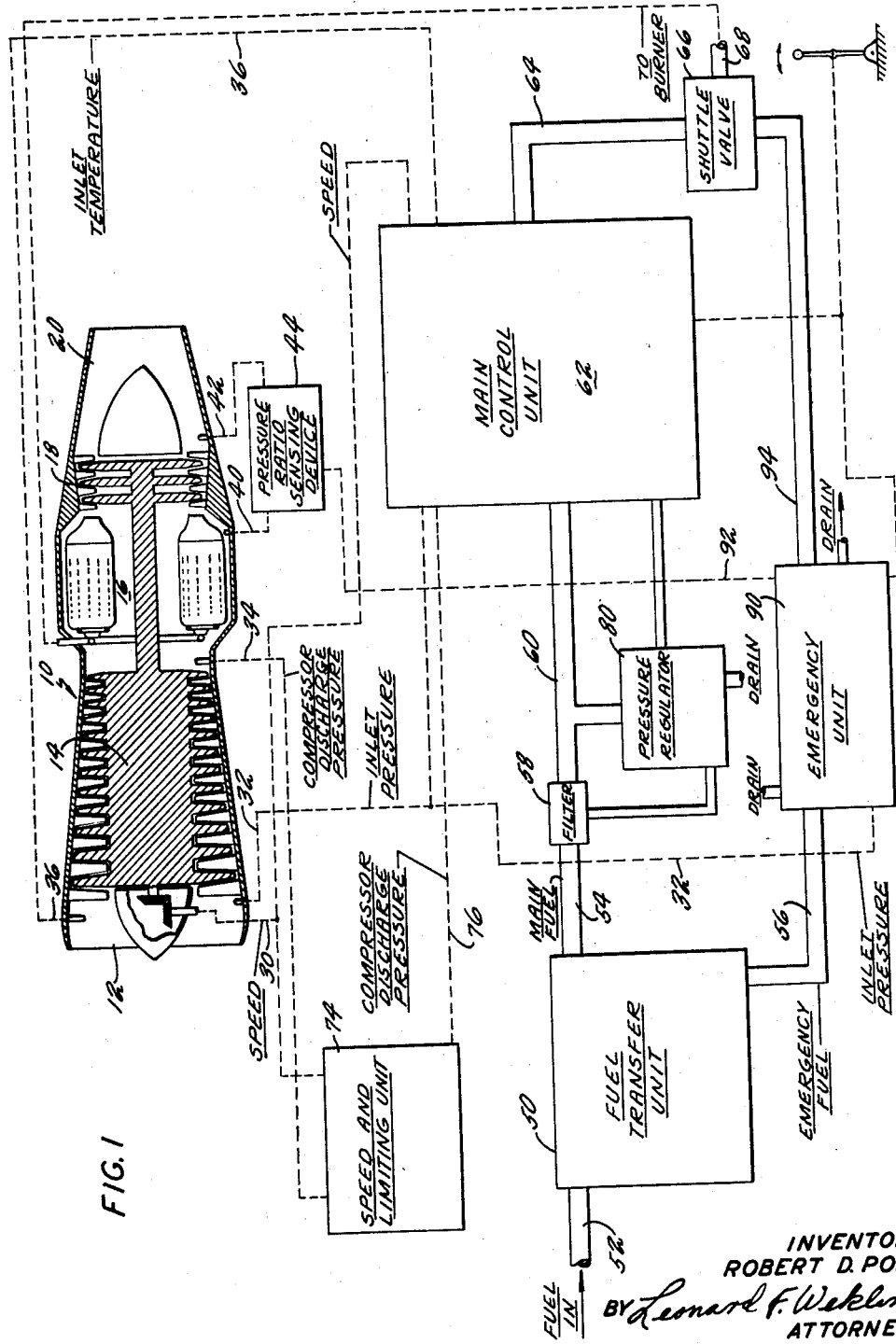
Fig. 1 is a cross sectional schematic of a power plant including a block diagram of the control of this invention.

Referring to Fig. 1, a turbine type power plant is generally indicated at 10 as having an inlet 12, a compressor section 14, a combustion chamber 16, a multiple stage turbine 18 and an exhaust nozzle 20. The control unit of this invention senses speed as shown by the dotted line 30, inlet pressure by means of the line 32, a compressor discharge pressure by means of the line 34 and inlet air temperature by means of the line 36. The lines 40, 42 measure the pressure ratio across the turbine section to operate a pressure ratio sensing device 44 whose function will be described hereinafter.

The control of this invention comprises a fuel transfer unit 50 which receives fuel from a main inlet line 52 and directs the fuel to the main line 54 or 56. The line 54 passes through a filter 58 and by means of line 60 flows to the main control unit 62. The main control unit 62 then feeds fuel to a line 64 leading to a shuttle valve 66 and a main feed line 68 leading to the combustion chamber 16. The topping and speed limiting unit 74 senses speed via the line 30 and compressor discharge pressure via the line 34 and modifies the compressor discharge signal which is fed via the line 76 to the main control unit 62. A pressure regulator 80 senses the pressure on the upstream and downstream sides of the main throttle valve of the main control unit 62 and maintains the pressure drop thereacross substantially constant. The emergency fuel control unit 90 senses compressor inlet pressure via the line 32 and receives a signal from the power lever. Fuel flows from the emergency unit 90 via the line 94 to the shuttle valve 66 so that it can be properly directed to the line 68 and the combustion chamber 16.

Figure 2:
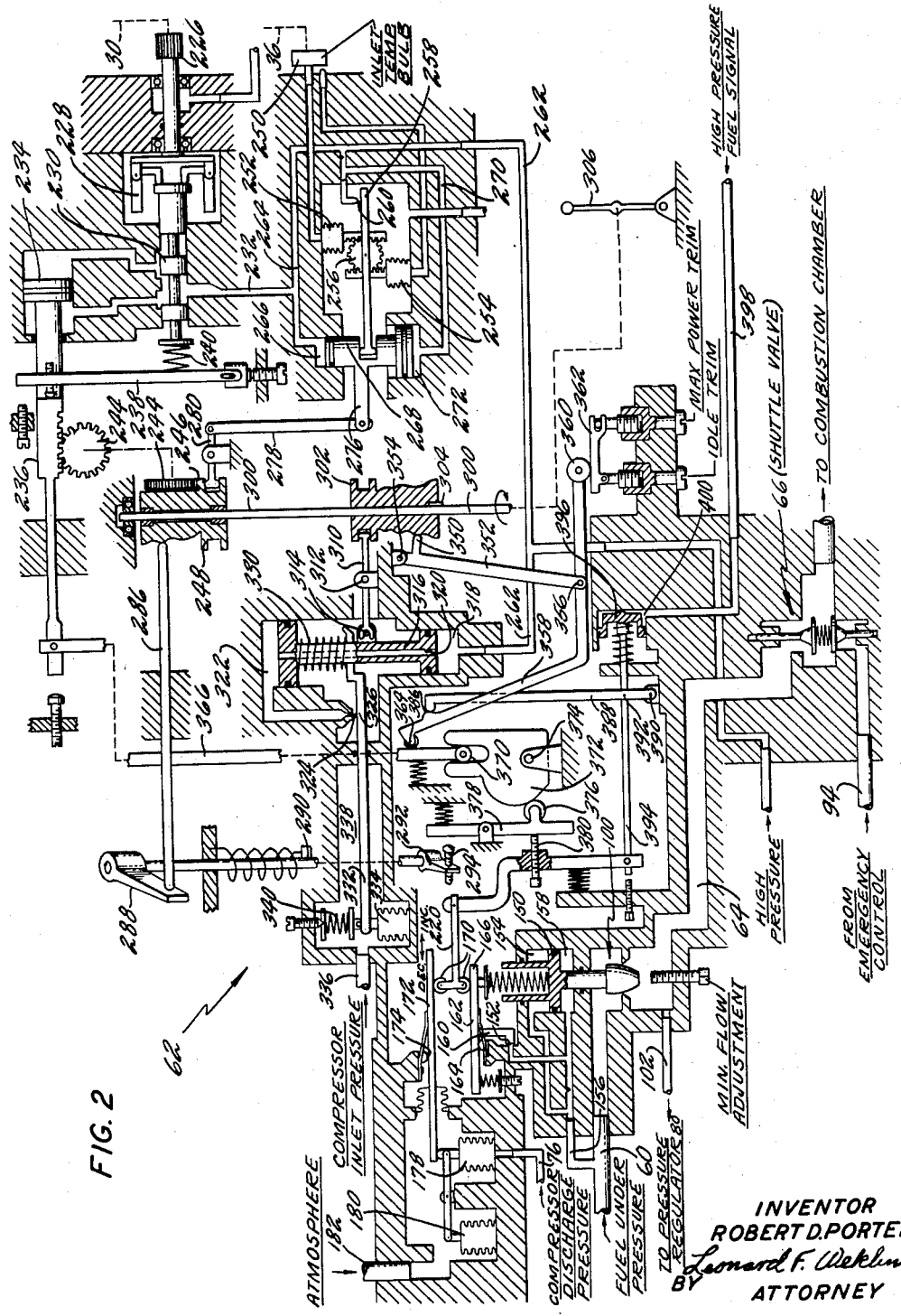
Fig. 2 is a schematic illustration of the main control unit.

The main fuel control unit 62 is more clearly illustrated in Fig. 2. Primarily, fuel under pressure is fed to the line 60 and is metered or regulated by a main throttle valve 100. Fuel from the main throttle valve 100 then flows to the line 64 leading to the shuttle valve 66. The pressure drop across the throttle valve 100 is maintained substantially constant by means of the pressure regulator 80 more clearly shown in Fig. 3. The pressure regulator receives fuel under pressure upstream of the throttle valve via the line 60. Pressure regulator 80 also receives fluid under pressure from downstream of the throttle valve by means of the line 102, see Figs. 2 and 3. The pressure regulator 80 comprises a main by-pass type valve 110 which receives fluid from the line 60 and the line 112 and by-passes a portion thereof to the drain line 114. A diaphragm 119 senses pressure from upstream of the throttle valve via the lines 112 and passage 116 which leads to the chamber 118 on one side of the diaphragm 119. The other side of the diaphragm 119 receives fluid under pressure existing at the downstream side of the throttle valve via the line 102 and chamber 120. In order to correct for errors in the valve element 110 a reset type mechanism is provided. This mechanism comprises a spring 124 whose compression is varied by a servo piston 126 depending upon the pressure existing in a variable volume chamber 128. The pressure in the chamber 128 is controlled by a variable orifice 130 which is controlled by the pressures existing on either side of a diaphragm 132. Thus the chamber 134 on the left side of the diaphragm 132 is subject to pressure downstream of the throttle valve while the chamber 136 on the right-hand side of the diaphragm 132 is subject to pressure on the upstream side of the main throttle valve 100. Since there is very little flow in chambers 134 and 136 the pressures therein will not be affected by the momentum of the fuel. Thus, the diaphragm 132 and the spring 138 control the opening of the variable orifice 130 to in turn control the pressure in the chamber 128 on the right-hand side of the piston 126.

This reset type servo is more clearly described and claimed in patent application Serial No. 611,339 for Pressure Regulating System, filed as of even date by Thomas P. Farkas.

The main throttle valve 100 is moved by a servo and the piston 150 whose position is controlled by a variable orifice 152. Thus, the upper chamber 154 is continuously exposed to high pressure fluid from the main line 60 and the line 156. On the other hand, the lower chamber 158 has the high pressure fluid therein regulated by the variable orifice 152, thus the area of the orifice 152 is a function of the position of the main throttle valve 100. The orifice 152 has its area varied by a depending arm 160 carried by a rod 162 pivoted at 164. Bar 162 is moved about its pivot 164 depending upon the pressure exerted on the right-hand side 166 thereof.

The throttle valve servo system is clearly shown and described in the above-referred-to co-pending application Serial No. 611,339 of Thomas P. Farkas.

The force balance system for controlling the throttle valve servo is disclosed and more broadly claimed in co-pending application Serial No. 528,878, filed August 17, 1955, by William E. Fortman.

The force exerted on the right-hand end 166 of the bar 162 depends upon the pressure exerted by the rollers 170 and the force exerted by the right-hand end of the bar 172 which is pivoted about 174. The bar 172 has its left end controlled by a bellows 178 which receives compressor discharge pressure from the line 76. A cooperating evacuated bellows 180 provides the system with an absolute pressure signal.

The outside of both bellows 178 and 180 is subject to atmospheric pressure from the line 182.

In discussing the compressor discharge signal which is transmitted to the throttle valve controlling bar 172, the topping and speed limiting system is best described at this point.

The compressor discharge pressure signal received by the line 76 and bellows 178 is transmitted thereto from the topping and limiting unit 74 clearly shown in Fig. 4. Herein compressor discharge pressure is received from the line 34 and is eventually fed to the line 76. A compressor discharge pressure limiting unit is generally indicated at 190. When the compressor discharge pressure exceeds a predetermined amount the pressure in line 192 and chamber 194 will rise sufficiently to exert a force against the preset spring 196 so as to open the valve 198. When the valve 198 is open the pressure being fed to the line 76 is false or lower than the actual compressor discharge pressure so that the main fuel control unit will obtain a signal for a decrease of fuel.

Likewise a speed signal is received via the shaft 30 which in turn rotates a speed governor 202. When the speed of rotation of the governor 202 reaches a high enough value the speeder spring 204 will be compressed thereby moving the arm 206 upwardly thereby to increase the opening of the variable area orifice 208. This action also bleeds air from the line 76 to the chamber 210 and the atmospheric vent 212. Thus, it is seen that the topping and limiting unit 74 can bleed the compressor discharge pressure signal to reduce fuel flow should either the compressor discharge pressure or the speed of rotation of the power plant exceed a predetermined value.

Returning to Fig. 2, it will be seen that the main throttle valve 100 is positioned in accordance with a compressor discharge pressure signal fed to the horizontal bar 172 which engages the rollers 170. Horizontal movement of the rollers 170 results from a signal eventually reaching the horizontal arm 220 connected to the rollers 170. The signal reaching the horizontal arm 220 is a result of a number of variables of power plant operation.

In the upper right-hand corner of Fig. 2 a gear 226 is illustrated as receiving a speed signal via the shaft 30 which, as seen in Fig. 1, connects to the power plant shaft. The gear 226 rotates a speed governor 228 which positions a pilot or control valve 230. The control valve 230 receives fluid under high pressure from the line 232 and meters it to either side of a servo piston 234 which in turn is connected to a rack 236. The piston 234 engages a feedback arm 238 which in turn varies the pressure on a spring 240 engaging the control valve 230. The rack 236 in turn rotates the pinion gear 244 which is shown both in plan view and end view and connected by broken lines for purposes of simple illustration. Pinion gear 244 engages a segmental tooth section 246 carried by a three dimensional cam 248. Thus, the speed signal generated by the speed governor 228 operates through its associated servo mechanism to rotate the three dimensional cam 248.

Just below the speed governor 228 in Fig. 2 a temperature sensing bulb 250 is illustrated as receiving its signal from the line 36 leading to the inlet 12 (Fig. 1) of the power plant. The temperature signal is fed to a main actuating bellows 252 which has associated therewith a correction bellows 254 whereby a gear 256 is operated. The gear 256 is carried by a bar 258 which varies the opening of the variable area orifice 260. Thus, with high pressure fluid being fed to the system via the line 262 the line 264 will also be under constant high pressure as will the chamber 266 on the top of servo piston 268. However, depending upon the opening of the variable area orifice 260 the pressure in the line 270 as well as the chamber 272 on the bottom side of the servo piston 268 will be at a somewhat lower pressure. Thus, depending upon the variable area orifice 260 the piston 268 will assume a predetermined position. Thus, motion of the servo piston 268 moves the depending arm 276 and the vertical link 278 and pin 280 to impart vertical motion to the three dimensional cam 248.

Therefore, the signal received by the horizontal rod 286 which engages the three dimensional cam 248 will be a combined signal representing actual power plant speed or r.p.m. and inlet air temperature.

The speed and inlet temperature signal which is received by the rod 286 is transmitted to a lever 288 which abuts the left end of the rod 286. The lever 288 rotates a spring loaded vertical rod 290 which carries at its bottom end a lever 292 and an abutment or stop 294. The member 294 in turn limits the horizontal movement of the adjacent lever 220 and thereby provides an acceleration limit for the fuel control. In other words, the stop 294 prevents too rapid an increase in fuel flow until the power plant is capable of handling larger amounts of fuel depending upon the inlet temperature and r.p.m.

The three dimensional cam 248 is mounted freely on a vertical shaft 300. However, another three dimensional cam 302 is fixed to the shaft 300 by a key 304. The shaft 300 is connected to the pilot's power lever 306 so that the cam 302 is rotated in response to movement of the power lever 306. Rotation of the cam 302 represents a desired speed setting signal.

The cam 302 is reciprocated by a lever 310 which is pivoted intermediate its ends at 312 and is connected at its left end 314 to a servo piston 316. The servo piston 316 is subject to high pressure fluid on the bottom side thereof by fluid which flows from the line 262 into the chamber 318. This fluid passes through an orifice 320 and then to the top side of the piston 316 to the chamber 322. Fluid in the chamber 322 is bled therefrom by a variable area orifice 324. The opening of the orifice 324 is regulated by an arm 326 biased at its right end by the spring 330 and moved at its left end 322 by an evacuated bellows 334. Compressor inlet pressure is received by the pipe 336 and passes into the chamber 338 whereby it acts on the outside of the bellows 334. A spring 340 provides an adjustable bias.

Thus, in summary, it should be noted that the second three dimensional cam 302 provides a speed setting signal which is biased by inlet air pressure. This combined signal is received by a cam follower 350 which moves a link 352 pivoted at its upper end at 354. The lower end of the link 352 is connected at 356 to a link 358 which carries a roller 360 at its right end. The roller 360 engages a member 362 which provides suitable adjustment as noted in the drawing. The extreme upper left end of link 358 has a roller 364 engaging a vertical rod 366. The vertical rod 366 is operably connected to the rack 236 shown in the upper portion of Fig. 2. Thus, the rack 236 transmits a signal to the rod 366 and the roller 364 representing an actual power plant speed signal. The lever 366 thereby receives both a speed setting and an actual speed signal thereby creating a speed error signal. The speed error signal is transmitted to the lower end of rod 366 to a roller 370 which rotates a cam 372 pivoted at 374. A cam follower 376 is carried by the pivoted link 378 which engages at set screw 380. The upper portion of set screw 380 is operably connected to the horizontal rod 220 which in turn moves the rollers 170 for actuating the main throttle valve 100.

The purpose of the roller 370 and the cam 372 just described is intended to provide a safety type linkage which cannot be overloaded; thus, the cam 372 has an outer curved surface which has a constant radius over a portion thereof so that excessive motion of the roller 370 and the rod 366 in relation to pilot's power lever setting will not damage the mechanism.

Adjacent the upper left-hand end of the rod 358 which transmits the speed setting signal a pivoted or contact point 386 is provided. This point is engaged by the upper end of a vertical rod 388 which is pivoted at 390. The rod 388 is connected at 392 to a horizontal rod 394 which carries at its right end a spring loaded piston 396. When the power plant afterburner, for example, is put into operation, a high pressure signal is received from the line 398 so that high pressure exists in the right-hand side of chamber 400 of the piston 396. This moves the horizontal rod 394 to the left thereby moving the vertical rod 388 toward the left or counterclockwise around its pivot 390. This motion through the linkage thus described tends to decrease fuel flow by a certain amount.

Fig. 5 illustrates the emergency portion of the fuel control of this invention. Fuel is received from the transfer unit 50 via the line 56 and flows into the line 420. The fuel is metered or regulated by a window type main throttle valve 422 and then flows outwardly through the line 94 to the shuttle valve 66. The main valve 422 comprises a plurality of ports in the body thereof and a sleeve 424 which is both rotatable and reciprocable.

The pilot's power lever rotates a rod 426 which moves a pin 428 which engages an arm 430 carried by the sleeve 424. Thus, the power lever 306 and the rod 426 rotate the sleeve 424. The sleeve 424 is reciprocated by a servo piston 434 which receives high pressure fluid from the line 420 via the line 436 and line 438. This high pressure fluid, however, is regulated by means of a variable area orifice 440 whose opening is controlled by an arm 442 pivoted at 444. The lower end of arm 442 is moved by an evacuated bellows 446 which is surrounded by compressor inlet air. The upper end of arm 442 engages a feedback spring 448 which in turn has a cam follower 450 engaging the cam 452 which is connected to the servo piston 434. The pressure drop across the main throttle valve 422 is regulated by means of a bypass type pressure regulator valve 460. This valve 460 regulates the pressure differential across adjustable orifice 464. In addition, adjustable orifice 466 is positioned to provide a fixed differential pressure across the main throttle valve 422. These valves are intended to cooperate with a valve 468 which, when moved in a downward direction, can bypass the orifice 466. Thus, should the pressure ratio across the turbine section 18 exceed a certain value, a high pressure signal will be received from the pressure ratio sensing device 44 (Fig. 1) to move the valve 468 downwardly so that the orifice 466 is bypassed and the pressure drop across the throttle valve 422 will be reduced by a given amount. The pressure ratio device may be of the type described in the following article: SAE Preprint No. 612, "A New Approach to Turbojet and Ramjet Engine Control," 1955, by Wendall Read.

Thus, for example, if we set the orifice or restriction 464 to provide, for example, a 25 p.s.i. drop with a given flow, the orifice or restriction 466 may be adjusted to provide a 75 p.s.i. drop. With a 25 p.s.i. spring backing up the pressure regulated valve 460, this valve will act to maintain a 25 p.s.i. drop across the restriction 464. The result is a 100 p.s.i. regulated pressure drop across the throttle valve 21. Now, if, for example, the pressure ratio across the turbine is such that the shuttle valve 468 is moved downwardly, the line 470 is now open to the line 472 and line 94 bypassing the restriction 466. This immediately drops the pressure in the chamber 462 behind the pressure regulated valve 460 since the restriction to flow through the valve 468 is much less than that at the orifice 466. As a result, the pressure regulated valve 460 moves toward the right decreasing the pressure drop across the throttle valve 422 and thereby decreasing fuel flow by a given percentage. If the system were designed for values of pressure drops as described above, the decrease of fuel flow will be exactly 50%.

The reduction of fuel flow by a given percentage can be shown as follows. The flow through the throttle valve 422 can be expressed as follows:

$$Q = CA\sqrt{\Delta P}$$

Where $Q$ = fuel flow
$C$ = constant
$A$ = area of throttle valve 422
$\Delta P$ = pressure drop across throttle valve For any given condition both C and A at the throttle valve will be constant and Q or fuel flow before and after the opening of valve 468 will be a ratio of the square root of the pressure drops for these two conditions.

Hence $$Q_1 = \sqrt{100} = 10$$
$$Q_2 = \sqrt{25} = 5$$

This is a 50% decrease in fuel flow between the open and closed positions of valve 468.

As a result of this invention a highly efficient and accurate fuel control mechanism has been provided both for normal operation and for emergency conditions.

Although only one embodiment of this invention has been illustrated and described herein, it will be apparent that various changes and modifications may be made in the construction and arrangement of the various parts without departing from the scope of this novel concept.

What is desired by Letters Patent is:

1. In a fuel control for a gas turbine power plant having a combustion chamber and a turbine receiving gases from said chamber, a source of fuel under pressure, throttle valve means for regulating the flow of fuel from said source to said chamber, a power lever, means responsive to movement of said power lever for controlling said throttle valve means, means for maintaining constant the pressure drop across said throttle valve, comprising a pressure regulating valve having two operative sides, said regulating valve having one of said sides connected with the upstream and downstream sides of said throttle valve means respectively and adapted to bypass some of the fluid flowing to said throttle valve, said regulating valve having a spring pressing the valve in one direction and said valve being urged in the other direction by a difference in pressure of the fluid being controlled acting on each of said sides, valve means consisting of a pair of continuously open valves connected in series with each other, both said valves having a fixed opening, said pair of valves being operatively connected with said regulating valve, and shuttle valve means having only full open and full closed positions for bypassing flow around one of said pair of valves and connecting the spring side of said regulating valve directly with the downstream side of said throttle valve, said shuttle valve being held in a closed position by the pressure on the downstream side of said throttle valve, said shuttle valve being held in a closed position by the pressure on the downstream side of said throttle valve acting on one side of said shuttle valve, means responsive to a predetermined relationship of the gas pressures at the inlet and outlet of said turbine and for providing a high pressure signal acting on the other side of said shuttle valve to immediately move said shuttle valve to an open position thereby reducing the pressure acting on one of the sides of said regulating valve and immediately reducing fuel flow across said throttle valve a fixed predetermined amount.

2. In a power plant having a compressor, a combustion chamber receiving air from said compressor, and a turbine receiving gases from said combustion chamber, a source of fuel, a main regulating mechanism for regulating the flow of fuel from said source to said combustion chamber including mechanism responsive to speed of rotation of the compressor and another variable of power plant operation indicative of power output, an emergency fuel regulating device for regulating the flow of fuel from said source to said combustion chamber including a throttle valve, manual means and another parameter of power plant operation for operating said throttle valve, means for maintaining constant the pressure drop across said throttle valve including a valve and a spring pressing the valve in a closed position, said spring-pressed valve having fluid connections with the upstream and downstream sides of said throttle valve for maintaining constant the pressure drop across said throttle valve, means consisting of a pair of bleed valves operatively connected to the spring side of said spring-pressed valve and having fixed openings, one of said bleed valves being connected to the upstream side of said throttle valve and discharging into the inlet of the other of said bleed valves, the other of said bleed valves connected to the downstream side of said throttle valve, a source of relatively low pressure, a shuttle valve held in a closed position by the relatively low pressure from said source acting on one side thereof, means responsive to the gas pressure variation across said turbine for providing a relatively high pressure signal acting on the other side of said shuttle valve thereby immediately moving said shuttle valve to an open position to bypass said other valve and thereby immediately reducing by a fixed predetermined amount the drop maintained across said throttle valve.

References Cited in the file of this patent

UNITED STATES PATENTS 2,737,015   Wright _____ Mar. 6, 1956